United States Patent [19]
Brown, Jr. et al.

[11] Patent Number: 5,268,199
[45] Date of Patent: Dec. 7, 1993

[54] ALKALI CORROSION RESISTANT COATINGS AND CERAMIC FOAMS HAVING SUPERFINE OPEN CELL STRUCTURE AND METHOD OF PROCESSING

[75] Inventors: Jesse J. Brown, Jr., Christiansburg; Deidre A. Hirschfeld, Elliston; Tingkai Li, Blacksburg, all of Va.

[73] Assignees: The Center of Innovative Technology, Herndon; Virginia Polytechnic Institute & State University; Virginia Tech Intellectual Properties, Inc., both of Blacksburg, all of Va.

[21] Appl. No.: 42,611

[22] Filed: Apr. 2, 1993

[51] Int. Cl.⁵ .............. B05D 3/02; C04B 35/48; B32B 18/00
[52] U.S. Cl. .................. 427/226; 427/244; 427/299; 427/373; 427/430.1; 428/697; 428/702; 428/908.8; 501/102; 106/14.12; 106/14.44
[58] Field of Search ............ 501/80, 81, 102; 427/373, 244, 226, 299, 430.1; 428/697, 702, 908.8; 106/14.12, 14.44

[56] References Cited

U.S. PATENT DOCUMENTS

| | | | |
|---|---|---|---|
| 3,538,202 | 11/1970 | Bidard | 501/81 |
| 4,221,594 | 9/1980 | Greskovich et al. | 501/81 |
| 4,247,249 | 1/1981 | Siemers | 501/102 |
| 4,258,099 | 3/1981 | Narumiya | 501/80 |
| 4,751,206 | 6/1988 | Yamai et al. | 501/102 |
| 4,801,566 | 1/1989 | Limaye et al. | 501/102 |
| 4,883,781 | 11/1989 | Watanabe et al. | 501/102 |
| 4,888,312 | 12/1989 | Watanabe et al. | 501/102 |
| 4,925,165 | 5/1990 | Watanabe et al. | 501/102 |
| 5,023,217 | 6/1991 | Everhart et al. | 501/80 |
| 5,039,340 | 8/1991 | Hargus et al. | 501/80 |
| 5,074,916 | 12/1991 | Hench et al. | 501/80 |
| 5,077,241 | 12/1991 | Moh et al. | 501/80 |
| 5,102,836 | 4/1992 | Brown et al. | 501/102 |
| 5,128,288 | 7/1992 | Ohashi et al. | 501/104 |

FOREIGN PATENT DOCUMENTS 2223324  10/1974  France .................. 501/81

*Primary Examiner*—Anthony Green
*Attorney, Agent, or Firm*—Whitham & Marhoefer

[57] ABSTRACT

Alkali corrosion resistant coatings and ceramic foams having superfine open cell structure are created using sol-gel processes. The processes have particular application in creating calcium magnesium zirconium phosphate, CMZP, coatings and foams.

14 Claims, 3 Drawing Sheets

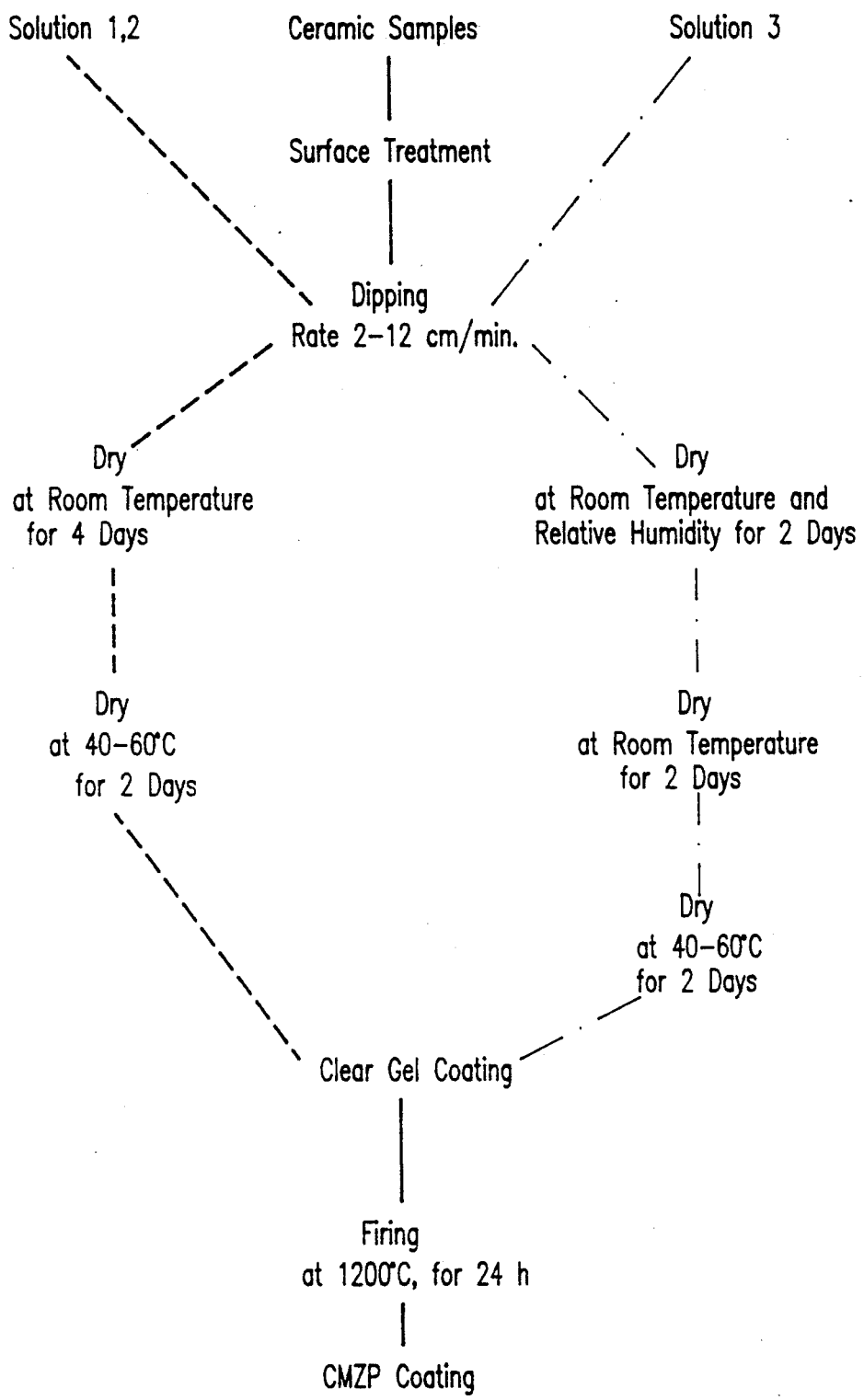
FIG. 1  The Processing of CMZP Coating Dense Ceramics

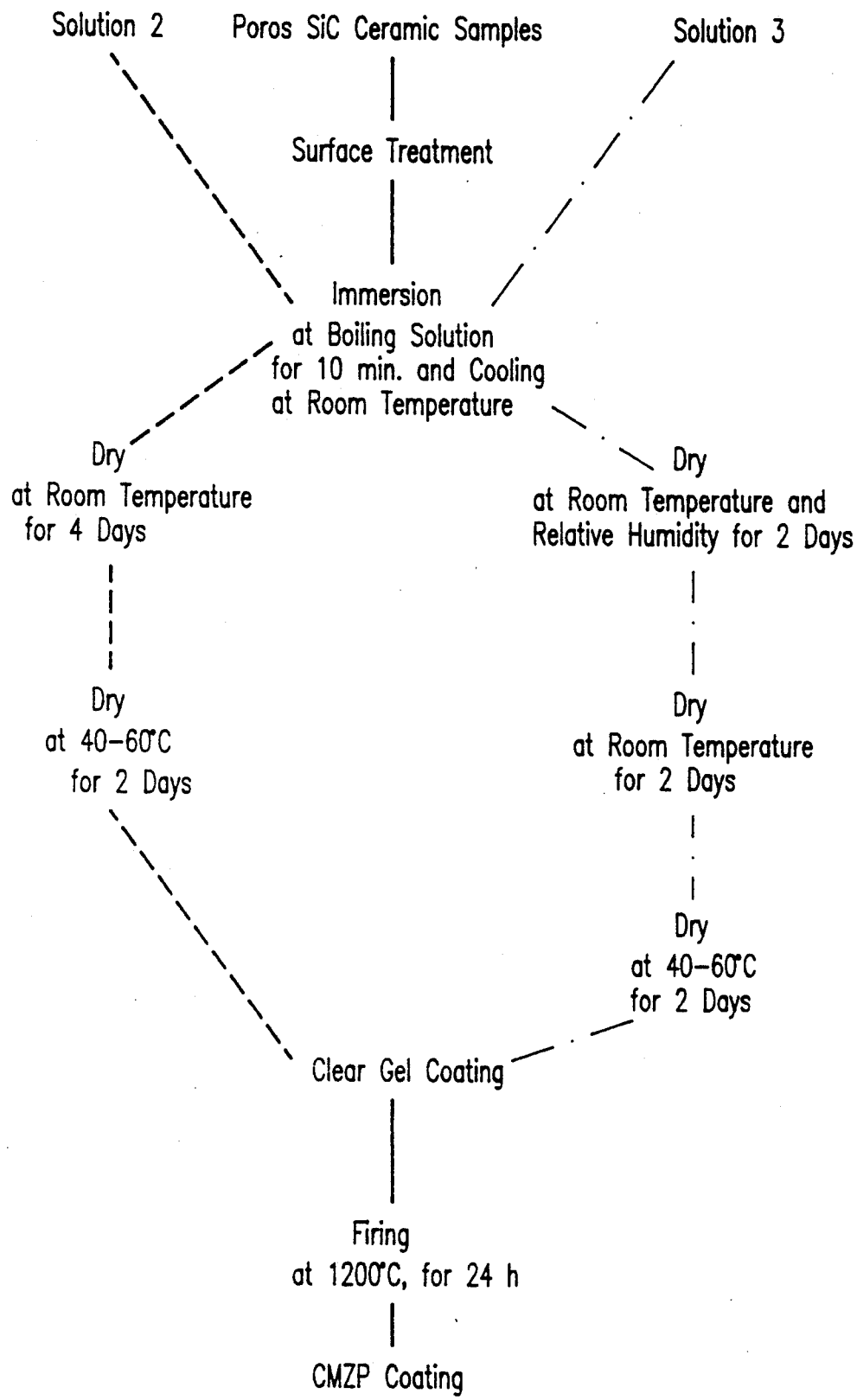
FIG.2 The Processing of CMZP Coating Porous SiC Ceramics

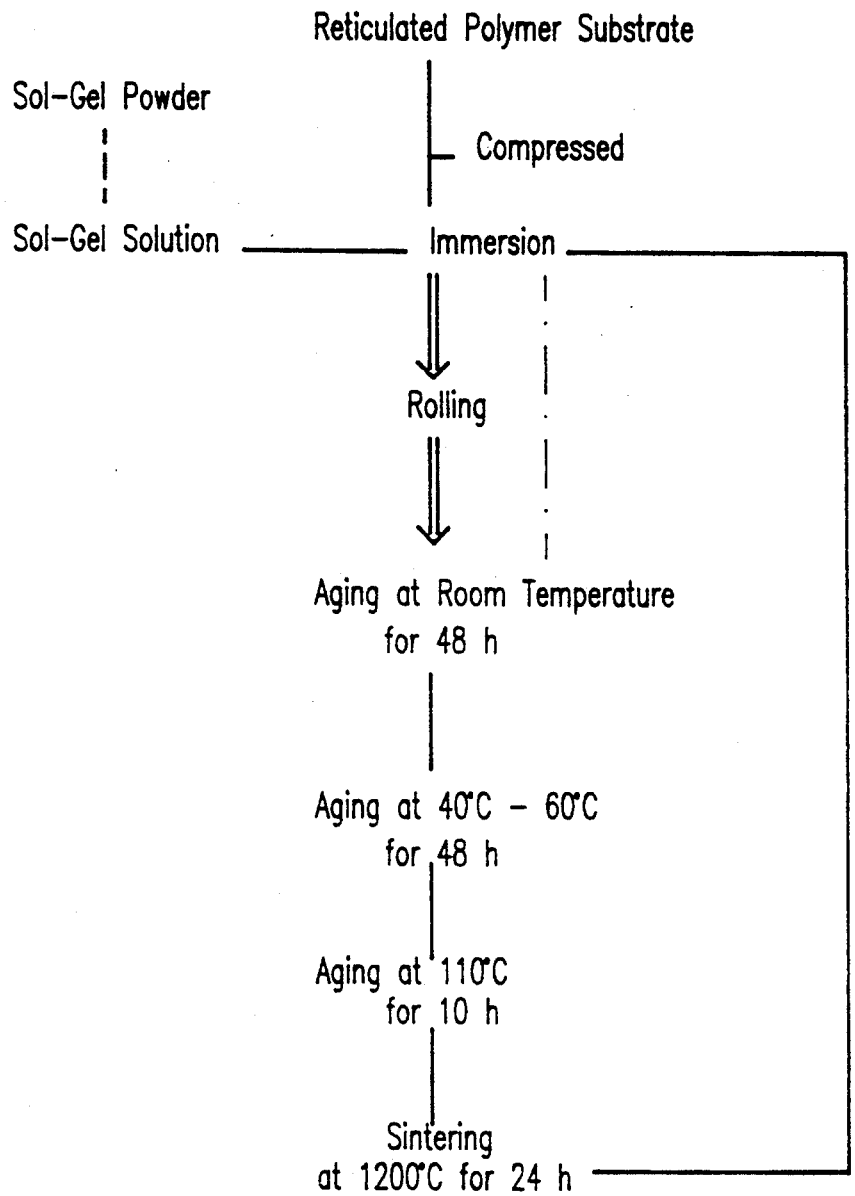
FIG.3 The Sol-Gel and Colloid Coating Methods

ALKALI CORROSION RESISTANT COATINGS AND CERAMIC FOAMS HAVING SUPERFINE OPEN CELL STRUCTURE AND METHOD OF PROCESSING

BACKGROUND OF THE INVENTION

1. Field of the Invention

The invention is generally related to new, dense, homogenous, crack-free ceramic oxide coatings and foams, and to new methods for forming these coatings and foams.

2. Description of the Prior Art

Ceramics in general are well known for their thermal stability, and often exhibit excellent resistance to wear and corrosion as well. Therefore, a great number of ceramic materials are candidates for applications in high-temperature, extremely corrosive environments encountered in a wide range of industries. Particularly challenging to the reliability of structural ceramic components are those applications requiring good resistance to attack by alkalies. These applications include: refractories subjected to the action of alkali vapors or slag in gas furnaces, blast furnaces and stove construction, cement kiln linings, combustion chamber boilers, and town gas installations; advanced high temperature coal conversion and combustion; heat exchangers; and other energy systems. It has been found that many ceramics can be attacked rapidly by alkali; therefore, the protection of ceramics from alkali corrosion is an important problem.

Currently, many materials in high temperature service are performing at their capability limits. As material requirements become increasingly sophisticated, it is becoming more and more difficult to combine the required structural properties and stability in a single material. The application of a high temperature thermal barrier and corrosion resistant material to substrates which possess the required mechanical properties for a specific application can produce cost-effective composite systems which optimize both corrosion resistance and strength.

For example, since non-oxide ceramics such as silicon carbide and silicon nitride inherently possess outstanding fracture strength to high temperature and have excellent thermal shock resistance and corrosion resistance in air at high temperatures, they can be fabricated into required shapes and sizes for structure applications at high temperatures. However, both silicon carbide and silicon nitride corrode severely in industrial furnace atmospheres containing alkali compounds. Therefore, applying ceramic oxide coatings which are more resistant to alkali compounds on the silicon carbide or silicon nitride substrates should produce a composite structure with both the superior thermal properties of silicon carbide and silicon nitride and the superior alkali resistance of the ceramic oxide coating.

In the past several years, several new materials having good alkali resistance have been developed including $(Ca_x, Mg_{1-x})Zr_4(PO_4)_6$ (CMZP), $ZrP_2O_7$, $Zr_2P_2O_9$, and the like.

Many coating technologies can be used to prepare a protective layer of ceramic materials. However, when applying alkali corrosion resistant coatings having complex composition onto ceramic elements having complex shapes (e.g., ceramic filters), using chemical vapor deposition (CVD), chemical vapor infiltration (CVI), and plasma methods may not be satisfactory. In addition, coating adhesion to the underlying ceramic material is problematic.

In recent years, it has been found that ceramic foams having an open cell structure have a wide variety of potential applications. For example, ceramic foams may be used for thermal insulation, as structural members requiring light weight and specific stiffness, as catalyst supports, as high temperature filters for gas and liquid metals, as dispenser cathodes, as diffuser plates, as part of mass transfer equipment, in conjunction with heater elements, or in many other applications. Ceramic foams having an open cell structure have been made in the past using slurry, CVI, and CVD methods. However, for the slurry method, it has been difficult to make ceramic foams having fine open cell structure, such as foams having pore diameters of less than 250 $\mu$m and a porosity higher than 87%. In addition, for CVI and CVD methods, it is difficult to produce ceramic foams having the necessary complex composition, and it is very expensive.

Brown et al. U.S. Pat. No. 5,102,836 discloses a prior invention by the applicants which is related to sol-gel and slurry processes for forming CMZP materials including CMZP foams. The CMZP materials were formed from inorganic precursor compounds, such as $Mg(NO_3)_2$, $Ca(NO_3)_2$, $ZrO(NO_3)_2$, and $NH_4H_2PO_4$, where the pH of a solution containing the compounds was adjusted to a range between pH 7-9, and water in the solution was evaporated to create a gel, then calcined to form CMZP powder. The CMZP powder was made into samples and sintered to form CMZP products. Slurry methods were used to produce CMZP foams. Using these slurry methods, the foams produced did not achieve a porosity greater than 87% and did not have pore diameters less than 250 $\mu$m.

SUMMARY OF THE INVENTION

It is an object of this invention to provide methods for preparing CMZP coatings and foams having the formula $(Ca_{1-x}, Mg_x)Zr_4(PO_4)_6$ where x ranges between 0.1 and 0.9 and is preferably 0.4.

It is another object of this invention to provide a CMZP coating with improved alkali resistance.

It is yet another object of this invention to provide a method to enhance CMZP adherence to a porous or non-porous ceramic substrate.

It is still another object of this invention to provide microporous ceramic foams having average pore diameters of less than 250 $\mu$m and greater than 87% porosity.

According to the invention, sol-gel processes using organic precursors are used to produce CMZP coatings and foams with enhanced alkali resistance. Selection of precursors, surface treatments of substrates, coating methods, and drying and sintering processes are adjusted to provide coatings of the desired thickness and character. Pretreatment of ceramic surfaces on which the CMZP coatings will be formed with an oxidation and acid wash enhances the adherence of the CMZP to the underlying ceramic substrate. Single phase ceramic foams with superfine open cell structure are produced using new sol-gel and colloid techniques. The foams are produced using certain organic precursors which have the general formula R-O-M, where R is an organic group having the formula $C_yH_{2y-1}$ where y ranges between 1 and 4, O is oxygen ion, and M is metal ion or phosphorous. When coating a reticulated polymer substrate, the R group of R-O-M is connected with the polymer strut and the M is connected with the colloidal particles.

BRIEF DESCRIPTION OF THE DRAWINGS

The foregoing and other objects, aspects and advantages will be better understood from the following detailed description of the preferred embodiments of the invention with reference to the drawings, in which:

FIG. 1 is a flow chart showing the processing steps for forming a CMZP coating on dense ceramics;

FIG. 2 is a flow chart showing the processing steps for forming a CMZP coating on porous ceramics; and FIG. 3 is a flow chart showing the sol-gel and colloid coating method for preparing superfine ceramic foams.

DETAILED DESCRIPTION OF THE PREFERRED EMBODIMENTS OF THE INVENTION

The basic principle of a sol-gel process is to form a solution of the elements of the desired compound in an inorganic or organic solvent, create a gel from the solution via polymerization, solvent evaporation, or other techniques, and to dry and fire the gel to form a final product. The term "sol-gel" encompasses many different processes. For example, Brown et al. U.S. Pat. No. 5,102,836 discuss a CMZP sol-gel process for preparing ceramic powders; however, the process cannot be used to form ceramic film coatings and foams. In Brown et al., the raw materials are all inorganic chemicals which are dissolved in water and coprecipitated to form a colloidal gel. The gel is then dried and sintered to form the CMZP powder. A more accurate description of Brown et al. would be to call the sol-gel method a liquid coprecipitation method. By contrast, the sol-gel process of this invention which is discussed below is most advantageously used for making ceramic films, coatings, foams, etc. The inventive method can also be used to make ceramic powder; however, presently it constitutes a more expensive method for making powder. The raw materials in the inventive sol-gel process should have at least one organic precursor chemical. The organic precursor chemicals are hydrolyzed in acid and polymerized to form a polymeric gel film coating after drying which is then sintered to form the ceramic coating or foam. The process can be used for producing ceramic coating and films as well as superfine foams of CMZP, mullite, and zirconia, and may be useful for producing other ceramic coatings and foams.

Test data presented below demonstrates that CMZP coatings and foams formed from solutions containing one or more organic constituents have enhanced alkali resistant properties. For ceramic foams having superfine open cell structure, one or all of the precursor compounds should have the general formula R-O-M, where R is an organic group having the formula $C_yH_{2y-1}$ where y ranges between 1 and 4, O is oxygen ion, and M is metal ion (e.g., Ca, Mg, or Zr) or phosphorus (P).

Three CMZP solutions were prepared according to the following methods.

Solution 1

Stoichiometric quantities of the inorganic precursors $Ca(NO_3)_2$, $Mg(NO_3)_2$, and $ZrO(NO_3)_2$ are mixed in deionized water or ethyl alcohol. Subsequently, and with constant stirring, $(C_2H_5O)_3P(O)$ is added to the solution dropwise until a clear CMZP solution is produced. For example, the solution can be prepared by combining 1.77 g of $Ca(NO_3)_2 \cdot 4H_2O$, 1.29 g $Mg(NO_3)_2 \cdot 6H_2O$, and 18.01 g $ZrO(NO_3)_2 \cdot xH_2$) in 50 ml of deionized water. The pH of the solution is adjusted to pH 1-4 by adding $HNO_3$. The CMZP solution is then completed by adding 13.55 g of $(C_2H_5O)_3P(O)$ in dropwise fashion to the solution.

Solution 2

Stoichiometric quantities of the organic precursors $Ca(CH_3CO_2) \cdot H_2O$, $Mg(C_2H_5O)_2$, $Zr(C_2H_5O)_4$, and $(C_2H_5O)_3P(O)$ are combined in ethyl alcohol or deionized water. The mixture is slowly stirred and HCl is added dropwise until a pH ranging between 1-4 is reached, yielding an acidified, clear CMZP solution. For example, the solution can be prepared by combining 0.65 g $Ca(CH_3CO_2) \cdot H_2O$, 0.29 g $Mg(C_2H_5O)_2$, 6.94 g $Zr(C_2H_5O)_4$, and 6.85 g $(C_2H_5O)_3P(O)$ in 50 ml $H_2O$. The mixture is then titrated with 5M HCl to pH 2. Mild stirring is performed during titration.

Solution 3

Stoichiometric quantities of $CaCl_2$ and $Mg(ClO_4)_2$ are combined together in ethyl alcohol. The mixture is stirred constantly while a stoichiometric quantity of $Zr(C_3H_7O)_4$ is added. Subsequently, $(C_2H_5O)_3P(O)$ is added dropwise to the mixture while stirring to produce a clear CMZP solution. For example, 0.83 g of $CaCl_2$ and 1.11 g of $Mg(ClO_4)_2$ are combined together in 25 ml of ethyl alcohol at pH 4. 23.43 g of $Zr(C_3H_7O)_4$ is added while stirring the mixture, and then 13.69 g $(C_2H_5O)_3$-$P(O)$ is added dropwise to the mixture while stirring to produce a clear CMZP solution.

In order to prepare crack-free CMZP films and to enhance the adhesion of the film to the underlying ceramic substrate, a surface treatment has been developed which enables the underlying ceramic substrate to be well wetted by the CMZP solutions of the present invention. Specifically, the ceramic surface is oxidized and hydroxy groups are created on the ceramic surface by an acid wash procedure. It has been discovered that the adhesion of CMZP to porous and non-porous ceramic substrates can be enhanced by creating a very thin oxide layer on those substrates or introducing hydroxy groups on the ceramic substrate surface. For alumina ceramics, an optimum pre-coating procedure involves immersing the samples in acetone for one hour to remove oil from the surface of the samples. The samples are then dried at 110° C. for two hours. Then the samples are immersed in 20% HF for ten minutes, and finally the samples are washed in deionized water and dried at 110° C. for two hours. For silicon carbide and silicon nitride ceramics, an optimum pre-coating process involves immersing the samples in acetone for one hour, the samples are then dried at 110° C. for two hours, then the samples are immersed in 20% HF for ten minutes, and finally the samples are washed with deionized water and calcined at 1200° C. for six hours. The sample drying times and temperatures as well as the choice of acid and concentration can vary for different applications. The main purpose of the pre-coating treatment is to produce an oxidized surface with surface hydroxy groups on the ceramic substrate which will have enhanced adhesion to CMZP when compared to ceramic substrates which are not pre-treated.

FIGS. 1 and 2 are flow charts of optimized procedures for forming CMZP coatings on dense and porous ceramic materials, respectively. The sol-gel techniques shown in FIGS. 1 and 2 were used to form CMZP coatings on alumina, silicon carbide and silicon nitride ceramics, and could be used for forming coatings on other ceramic materials. The three solutions described above were concentrated by drying to form polymeric gel films. The sol-gels of the present invention have a high degree of microhomogeneity. Since the chemical reactants used in the inventive sol-gel process can be conveniently purified by distillation and crystallization, a ceramic coating of very high purity can be obtained. FIGS. 1 and 2 show that the sol-gels can be dried at room temperatures and at relative humidities of 40–80%. Cracks formed in the dried films when their thickness was generally greater than 10 μm after drying, and the exact film thickness limit was found to be a function of process conditions.

As shown in FIG. 1, the surface treated ceramic sample is dipped in a CMZP solution (solutions 1–3) for five minutes. Dipping and removal of the sample occurs at a rate of 2–12 cm/min. For samples dipped in solutions 1 and 2, the CMZP coated ceramic samples are kept at room temperature for four days, and dried at a temperature of 40°–60° C. for two days. The room temperature handling followed by two day heat treatment produces a clear CMZP gel coating. For samples dipped in solution 3, the CMZP coated ceramic samples were first kept at room temperature and at a relative humidity of 40–80% for hydrolysis, and then were dried at room temperature for an additional two days. As with the handling processes for solutions 1 and 2, the ceramic coated samples were dried at a temperature of 40°–60° C. for two days to produce a clear CMZP gel coating on the samples. Finally, the samples with clear CMZP gel coatings, formed using any of the solutions 1–3, are fired at 1200° C. for twenty four hours. The heating schedule used comprised a heating rate of 0.5° C./min to 500° C., holding two hours at 200° C., 300° C., 400° C., and 500° C., respectively, followed by rapid heating from 500° C. to 1200° C. at 5° C./min with and intermediate four hour hold at 1000° C. prior to the twenty four hour hold at 1200° C. The heat treatment removes all solvent and organic components from the sol-gel and creates a dense, single-phase, inorganic CMZP coating.

FIG. 2 shows the processes used for coating porous silicon carbide ceramic materials; however, it should be understood that the procedures are applicable to other porous ceramic materials. First, the surface treated ceramic samples are immersed into a boiling solution (solutions 2 or 3) for 10–30 minutes. The ceramic samples remain in solution while the temperature is reduced from boiling to room temperature, and are taken out of the cooled solution at a rate of 2–12 cm/min. Alternatively, the ceramic samples can be dip coated under a vacuum condition. Similar to the procedures discussed in conjunction with FIG. 1, the ceramic sample with coated CMZP solution is either dried at room temperature for four days followed by drying at 40°–60° C. for two days, or is dried at room temperature for two days at a relative humidity of 40–80%, followed by drying at room temperature for an additional two days and finally drying at 40°–60° C. for two days. The clear CMZP solutions which result are fired at 1200° C. for twenty four hours using the controlled heating schedule discussed above.

Table 1 shows that using different CMZP precursors and varying the precursor concentrations can result in CMZP coatings of differing thicknesses.

TABLE 1

| Sintered Coating Thickness of CMZP | |
|---|---|
| Solution 1 | 1–2 μm |
| Solution 2 | 1–5 μm |
| Solution 3 | 1–4 μm |

Table 1 shows the thickness of the CMZP coating after sintering. As pointed out above, 10 μm thick gels after drying is about the maximum thickness which can be achieved after drying without having the gel crack. A 10 μm thick gel coating will typically yield a 5 μm CMZP coating after sintering. The formation of the sol-gel coatings of this invention depends on polymeric compounds formed from organic precursors. Thicker coatings can be achieved using greater quantities of organic precursors.

Table 2 shows the surface and interface characteristic of thin film coatings of CMZP formed on alumina, silicon nitride and silicon carbide substrates, including porous silicon carbide.

TABLE 2

| The Microstructure of CMZP Thin Film Coatings | | | | | |
|---|---|---|---|---|---|
| Substrates precursors | I[a] | $Al_2O_3$ O[b] | $Si_3N_4$ O | dense SiC O | porous SiC O |
| surface | flat | uneven | uneven | uneven | flat |
| grain size (μm) | 2–3 | 4–5 | 2–3 | 2 | 3 |
| morphology of grains | spheriod | | | hexahedron | |
| thickness of coatings (μm) | 1–2 | 2–3 | 2–3 | 2–3 | 2–5 |
| coating adhesion | good | | | excellent | |

[a] I = inorganic
[b] O = organic

The CMZP coating thicknesses varied from 1–5 microns and were dependent on the selected precursors and their concentration in solution. Judicious selection of precursors and precursor concentrations can resulted in films of controlled thicknesses. The CMZP coatings derived from the inorganic precursors of solution 1 had a relative thin thickness with small grains. In contrast, the organic precursors used in solutions 2 and 3 produced thicker films with large grains. Homogenous, crack-free coatings for porous silicon carbide substrates were produced on both the outer surface and the interior section of the pore walls with excellent interfacial bonding. Phase identification showed that the CMZP coatings were almost single phase.

With particular reference to the formation of CMZP coatings on alumina substrates, Table 2 shows that both the inorganic precursors of solution 1 and the organic precursors of solution 2 can successfully form CMZP coatings using sol-gel dip coating processes. The introduction of a hydroxy (OH) group on the surface of the alumina samples by HF acid surface treatment made the carrier surface well wetted by the solutions, so that dense CMZP coatings with excellent adhesion to the alumina were obtained. The coating derived from the inorganic precursors of solution 1 is flat and results in a very thin film of approximately 1–2 μm in which there are some very small pores. The organic precursors of solution 2 resulted in an uneven thick film of about 2–3 μm in which there is also some very small pores, and large hexahedral grains of about 4–5 μm.

With particular reference to the formation of CMZP films on dense SiC and silicon nitride substrates, Table 2 shows that organic precursors (solutions 2 and 3) can be used to form dense, crack-free coatings of about 2–3 μm in thickness. The oxidation layer on the samples by the surface treatment improved the coating adhesion. The hexahedral grains exhibited a uniform grain size of 2–3 μm.

Table 2 also shows that the organic precursors of solutions 2 and 3 can be used to prepare CMZP coatings on porous SiC ceramics. The oxidation layer formed on the surface of SiC samples by the acid wash pre-coating treatment improved the coating adhesion to the porous SiC ceramics both on the surface and inside the pores and aided in producing dense film coatings. The sol-gel dip processes shown in FIG. 2 enabled homogenous, crack-free CMZP coatings to be produced on both the outer surface and the interior sections of the pore walls with excellent interfacial bonding. The CMZP coating on the porous SiC samples was a flat, dense, crack-free thin film with small grains on the order of 3–4 μm. The coating thickness ranged between 2–5 μm with the surface thickness generally being 4 μm and the pore wall thickness generally being 2 82 m.

CMZP coated alumina, silicon nitride, dense silicon carbide, and porous silicon carbide samples were tested for thermal shock resistance. In order to compare the thermal shock resistance of CMZP coatings on different ceramics, the CMZP coatings were made with the same organic precursors, specifically the precursors of solution 2 above, and the ceramics were pretreated as described above. In each test, five coated samples were used, each of which had the approximate dimensions of 2 mm by 3 mm by 10 mm. The samples were heated to 300° C., 500° C., and 1000° C., respectively, and then quenched in water at 25° C. The surface microstructure of coatings and adhesion between the coatings and ceramic substrate were examined by scanning electron microscopy. Table 3 shows the experimental results for thermal shock resistance by the CMZP coatings.

TABLE 3

Thermal Shock Resistance of CMZP Coatings

| Substrates | 300° C. | 500° C. | 1000° C. |
|---|---|---|---|
| Si$_3$N$_4$ | no crack | no crack | cracks |
| Dense SiC | no crack | small cracks | cracks and spalling |
| Al$_2$O$_3$ | small cracks | cracks and spalling | |
| Porous SiC outer surface | no crack | small cracks | cracks and spalling |
| Porous SiC surface of interior pore walls | no crack | no crack | small cracks |

Table 3 demonstrates that CMZP coatings formed on silicon nitride, dense silicon carbide, and porous silicon carbide have good thermal shock resistance. The CMZP coatings on silicon nitride performed the best, and this is probably due silicon nitride having the closest matching coefficient of thermal expansion (CTE) with CMZP. Table 4 presents the CTE for each of the materials subjected to the thermal shock test.

TABLE 4

| The Coefficient of Thermal Expansion of Materials | | | | |
|---|---|---|---|---|
| CTE | CMZP | Si$_3$N$_4$ | SiC | Al$_2$O$_3$ |
| 10$^{-6}$/°C. | 0–2 | 3 | 5.5 | 8 |

The alkali resistance of CMZP powder and CMZP coatings on silicon nitride and silicon carbide was determined by investigating their performance in the presence of sodium carbonate at elevated temperatures. The CMZP powders and coatings were both made using the organic precursors of solution 2 described above. In the investigation with CMZP powder, 10 g of CMZP powder prepared from solution 2 was mixed with 5, 10, and 20 wt % Na$_2$CO$_3$ and calcined at 850° C. to remove decomposed products of Na$_2$CO$_3$. Subsequently, the CMZP powder was calcined at 900° C., 1000° C., 1200° C., and 1300° C. for 10–50 hours. After the heat treatment, weight loss of the powder and phase identification was performed. Table 5 presents the corrosion resistance results for CMZP powder.

TABLE 5

| | The Alkali Corrosion Resistance of CMZP Powder | | | | | |
|---|---|---|---|---|---|---|
| | CMZP + 5%Na$_2$CO$_3$ | | CMZP + 10%Na$_2$CO$_3$ | | CMZP + 20%Na$_2$CO$_3$ | |
| Treatment | weight loss % | phase analysis | weight loss % | phase analysis | weight loss % | phase analysis |
| 900° C. 10 h | 0.00 | CMZP | 0.00 | CMZP | 0.00 | CMZP |
| 1000° C. 10 h | 0.00 | CMZP | 0.00 | CMZP | 0.00 | CMZP |
| 1000° C. 30 h | 0.00 | CMZP | 0.00 | CMZP | 0.00 | CMZP |
| 1000° C. 50 h | 0.00 | CMZP | 0.00 | CMZP | 0.00 | CMZP |
| 1200° C. 10 h | 0.18 | CMZP | 0.55 | CMZP | 0.63 | CMZP |
| 1300° C. | 0.15 | CMZP | 2.20 | CMZP | 2.56 | CMZP + glass |

Table 5 shows that CMZP formed from solution 2 exhibits good alkali corrosion resistance. Specifically, CMZP powders experience zero weight loss even when exposed to temperatures of 1000° C. for 50 hours. Phase identification showed a single CMZP for all samples up to 1200° C. CMZP+glass phase was not observed until a CMZP powder was subjected to 20% Na$_2$CO$_3$ at 1300° C. for 10 hours.

In the investigations for alkali resistance of CMZP coatings, hot pressed silicon nitride (HP-Si$_3$N$_4$), HP-SiC, and porous-sintered SiC were used as corrosion testing samples. Each of the samples were cut into rectangular coupons having the approximate size of 10 mm by 4 mm by 5 mm. The coupons were polished and cleaned using detergent, deionized water, acetone, and alcohol. Some coupons were coated with CMZP formed using the processes outlined in FIGS. 1 and 2 and the inorganic and organic precursor sol-gel solutions 1 and 2. The coupons were weighed and were then heated at 200° C. on a hot plate and dip coated with a saturated solution of $Na_2CO_3$ and controlled to 2–3 mg/cm$^2$. The coupons were placed in an electric furnace regulated at 1000° C. for 40 hours. Subsequently, the coupons were washed in distilled water at 100° C. to remove any residual salt or sodium silicates. The coupons were then chemically etched in 10% HF acid to remove surface corrosion products so that the unreacted portion of the samples could be weighed. Etching was performed until no noticeable difference in weight change versus time was recorded. Table 6 shows the weight loss for CMZP coated and uncoated samples of dense SiC and porous SiC.

TABLE 6

Alkali Corrosion Resistance of CMZP Coatings in terms of % weight loss after alkali treatment

| Coupon | Coupons coated w/CMZP | | | | | | uncoated coupons | | |
|---|---|---|---|---|---|---|---|---|---|
| | Solution 1 | | | Solution 2 | | | | | |
| Dense SiC | 4.9 | 4.2 | 4.1 | 1.9 | 1.5 | 1.5 | 5.5 | 5.6 | 5.8 |
| porous SiC | 7.8 | 7.5 | 6.6 | 4.7 | 4.5 | 4.3 | 8.5 | 8.7 | 9.1 |

Table 6 shows that CMZP coated dense or porous SiC experiences less weight loss than uncoated SiC. With particular regard to the performance of the CMZP coatings formed with the organic precursors relative to the performance of the CMZP coatings formed with the inorganic precursors, Table 6 demonstrates that the CMZP coatings formed from the organic precursors of solution 2 has substantially better performance than the CMZP coatings formed from inorganic precursors of solution 1.

The HP-Si$_3$N$_4$ coupons which were prepared and exposed to an oxidizing atmosphere at 1000° C. for 40 hours as described above were analyzed for both percentage weight loss and for strength. During the heat treatment, some coupons were coated with Na$_2$CO$_3$ and exposed to sodium vapor. The strength measurements were made at room temperature using a four-point bend fixture having an outer span of 4 cm and an inner span of 2 cm. The loading rate was 0.05 cm/min (0.02 in/min). Table 7 presents the alkali corrosion resistance results for uncoated silicon nitride coupons and silicon nitride coupons coated with CMZP formed using the organic precursors of solution 2 using the procedures of FIG. 1.

TABLE 7

Alkali Corrosion Resistance of CMZP Coated Si$_3$N$_4$

| Strength | Coupons coated with CMZP from solution 2 | | uncoated coupons | |
|---|---|---|---|---|
| | Weight loss % | Strength (MPa) | Weight loss % | (MPa) |
| Before alkali corrosion | 0 | 593 | 0 | 595 |
| After alkali corrosion 1* | 1.68 | 669 | 4.41 | 573 |
| After alkali corrosion 2** | 5.24 | 611 | 7.04 | 546 |

*Coupons coated with a saturated solution of Na$_2$CO$_3$
**Coupons coated with a saturated solution of Na$_2$CO$_3$ and exposed to an alkali vapor.

A number of experiments have been conducted with ceramic foams where the foams were made by sol-gel and sol-gel colloid. Several foams which were produced were of the sodium zirconium phosphate (NZP) variety which have zero or negative coefficients of thermal expansion. As is explained in Brown et al. U.S. Pat. No. 5,102,836 which is herein incorporated by reference, the basic NZP structure remains unchanged when the sodium is replaced with certain other elements, such as other alkalis, alkaline earths, and transition metals. The NZP structure consists of a three dimensional network of $PO_4$ tetrahedra, and $ZrO_6$ octahedra that are linked together by shared oxygens. Each $ZrO_6$ octahedron is connected to six $PO_4$ tetrahedra through the six oxygen atoms coordinated around zirconium.

The following six ceramic materials, including three NZP materials, were prepared for foam formation.

CMZP Solution 2 (Discussed Above)

$Ca(CH_3CO_2) \cdot H_2O$, $Mg(C_2H_5O)_2$, $Zr(C_2H_5O)_4$, and $(C_2H_5O)_3P(O)$ precursors are combined together in stoichiometric proportions in ethyl alcohol or deionized water. HCl is then titrated into the mixture while stirring to achieve a pH of 2.

CMZP Solution 3 (Discussed Above)

Stoichiometric quantities of $CaCl_2$ and $Mg(ClO_4)_2$ are dissolved in ethyl alcohol, then $Zr(C_3H_7O)_4$ is added during stirring, and $(C_2H_5O)_3P(O)$ is added dropwise while stirring to form the CMZP solution.

ZrP$_2$O$_7$ Solution $Zr(C_3H_7O)_4$ and $(C_2H_5O)_3P(O)$ are mixed in stoichiometric proportions in ethyl alcohol to produce the ZrP$_2$O$_7$ solution.

Zirconia Solution $Zr(C_2H_5O)_4$ and $YCl \cdot 6H_2O$ are mixed in stoichiometric proportions in ethyl alcohol which was kept at 90° C. and stirred while 1 mole water and 0.1 mol HCl per mol of $Zr(C_2H_5O)_4$ is added. The solution is kept boiling until a clear solution is formed.

Alumina Solution

Aluminum isopropoxide is added to deionized water which is heated to approximately 90° C. while vigorously stirring. The solution is kept at 90° C. for two hours. Subsequently, 0.07 moles HCl per mole alkoxide is added to peptize the solid particles. The solution is kept boiling in an open reactor until a clear solution is formed.

Mullite Solution

Aluminum isopropoxide $(((CH_3)_2CHO)_3Al)$ is added to deionized water that is heated to approximately 90° C. while vigorously stirring. The solution is maintained at 90° C. for two hours, afterwhich $Si(OC_2H_5)_4$ is added. Finally, 0.07 moles HCl per mole alkoxide is added to peptize the solid particles and the sol is kept boiling in an open reactor until a clear solution is formed.

FIG. 3 is a flowchart showing the process steps for four processes used for sol-gel and colloid processes used in producing ceramic oxide foams. A reticulated polymer substrate is used in each of the processes. The reticulated polymer substrates should behave like sponges and be sufficiently elastic to regain their shape after compression. The pore sizes of the gel foam after drying depend on the pore sizes of the polymer foams, but the final pore sizes of the ceramic foams also depend on shrinkage from gel to ceramic. Hence, to achieve a small pore size ceramic foam a very small pore size reticulated polymer substrate (e.g, SiF, etc.) should be used, because the pore size of the resulting ceramic foam will be slightly larger than that of the reticulated polymer substrate. Suitable polymeric substrates might have 45-100 pores per inch (ppi). The sol-gel solutions described above, as well as other sol-gel solutions formed from organic precursors having the general formula R-O-M where R is an organic group having the formula $C_yH_{2y-1}$ where y ranges between 1 and 4, O is oxygen ion, and M is metal ion (Ca, Mg, Zr, etc.) or a phosphorous, should be incorporated into the reticulated polymer substrates in the same manner that water is taken into a sponge. Specifically, the substrate is compressed, then immersed into a sol-gel solution, and then is allowed to expand. The sol-gel solution penetrates into the reticulated substrate during expansion.

In the first process shown in FIG. 3 (process 1), repeated rolling of the reticulated substrate is performed to reduce the solution content, then the reticulated polymer substrate coated with a ceramic solution is dried. Room temperature drying for two days at 40°-60° C., followed by drying at 110° C. for ten hours was used for drying. The foam is finally sintered at 1200° C. for twenty four hours. The polymer is burned off at a temperature from 200° C.-500° C. The heating schedule for sintering consisted of a heating rate of 1°0 C./min to 500° C., holding for two hours ate 200° C., 300° C., 400° C., 500° C., respectively, followed by rapid heating from 500° C. to 1200° C. at 5° C./min with a four hour hold at 1000° C. prior to reaching the 1200°0 C. temperature.

The second process shown in FIG. 3 (process 2) is similar to the first process, but the polymer foams coated by the ceramic materials are directly dried and sintered after the polymer substrates are immersed in the solution.

The third process shown in FIG. 3 (process 3) is similar to the first process, but the ceramic foams were coated and sintered twice. As shown in FIG. 3, process three follows the solid line, the dotted-dashed line, and the double arrow head line. First, the polymer substrate is immersed in the solution. Second, the solution in the polymer substrate is aged. Third, sintring is performed. Fourth, immersion is performed again, followed by aging and sintering again.

The fourth process shown in FIG. 3 (process 4 ) is similar to the first process, except the coating solution was a sol-gel and colloidal suspension. For example, 3-10 wt % CMZP powder made by the sol-gel method using solution 2 was added to CMZP solution 2 during stirring to form a coating solution.

Table 8 shows the properties of certain ceramic foams produced using reticulated polymer substrates of different open cell size using the four processes outlined above for the sol-gel colloid solutions.

TABLE 8

| Composition | Properties of Ceramic Foams | | | | |
|---|---|---|---|---|---|
| | Pore size (ppi)* | Average pore dia. (μm) | Unit bulk density (g/cc) | Unit porosity (%) | Processing |
| $Ca_{0.6}Mg_{0.4}ZP$ | 100 | 145 | 0.13 | 95.9 | 1 |
| | 100 | 110 | 0.28 | 91.2 | 2 |
| | 100 | 120 | 0.25 | 92.1 | 4** |
| | 80 | 190 | 0.08 | 97.6 | 1 |
| | 60 | 250 | 0.07 | 97.7 | 1 |

TABLE 8-continued

| Composition | Properties of Ceramic Foams | | | | |
|---|---|---|---|---|---|
| | Pore size (ppi)* | Average pore dia. (μm) | Unit bulk density (g/cc) | Unit porosity (%) | Processing |
| | 45 | 390 | 0.57 | 82.2 | 4 |
| $ZrP_2O_7$ | 100 | 140 | 0.13 | 95.9 | 1 |
| | 100 | 120 | 0.31 | 90.1 | 2 |
| | 100 | 120 | 0.48 | 84.7 | 3 |
| | 80 | 175 | 0.11 | 96.3 | 1 |
| | 60 | 234 | 0.12 | 96.2 | 1 |
| | 45 | 311 | 0.14 | 95.6 | 1 |

*Pore size: ppi = No. of pores per linear inch of one of polymer foams.

The CMZP and $ZrP_2O_7$ ceramic foams have a very small cell size (average pore diameters of less than 140 μm). There was complete emptying of the cells resulting in very low density and porosities up to 97.7%. Phase identification showed that the ceramic foams were almost single phase. Prior ceramic foam formation techniques which employ slurries, e.g., Brown et al. referenced above, yield foams no smaller than 250 μm and a porosity no greater than 87%. Hence, the sol-gel methods of this invention provide for significant improvement in terms of pore size and porosity.

In foam formation, the dense ceramic coating retains the general morphology of the reticulated polymer substrate. The CMZP ceramic foams made by the first process had complete emptying of the cell, high porosity, and thin walls. Using processes 2 and 3, the diameter of the struts (the ceramic is foam connected by many struts) increased and pore size and porosity decrease. In addition, the complete emptying of cells was difficult to achieve. Using process 4, ceramic foams having thick struts can be made. The ceramic foams made using process 4 have increased strength, but have decreased porosity and smaller pore diameters. Because the sol-gel solution contains some powder, the microstructure of the densified struts has two kinds of grains which have different sizes. The larger grains come from the sol-gel solution, and the smaller grains come from the CMZP powder. The diameters of struts which are hollow resulting from polymer substrate pyrolysis vary between 20 and 100 μm in diameter when the pore size of the reticulated polymer substrate ranges from 100 ppi to 45 ppi. The wall thickness of the struts tends to be constant.

Other ceramic oxide foams have been formed using the sol-gel process techniques described above. Table 9 presents the characteristics determined for a variety of ceramic oxides produced using process 1 described above.

TABLE 9

| Characteristics of other Ceramic Foams having Superfine Open Cell Structure | | | | | |
|---|---|---|---|---|---|
| Composition | Heat treatment | Pore size (ppi)* | Average pore dia. (μm) | Unit bulk density (g/cc) | Unit porosity (%) |
| $Al_2O_3$ | 500° C., 10 h | 60 | 285 | 0.057 | 98.2 |
| | 1200° C., 10 h | 45 | 390 | 0.042 | 98.9 |
| | 1200° C., 10 h | 20 | 1100 | 0.035 | 99.1 |
| | 1500° C., 10 h | 100 | 100 | 0.082 | 97.9 |
| | 1500° C., 10 h | 100 | 110 | 0.067 | 98.3 |
| | 1500° C., 10 h | 100 | 120 | 0.051 | 98.7 |
| | 1500° C., 10 h | 60 | 260 | 0.053 | 98.6 |
| | 1500° C., 10 h | 45 | 380 | 0.036 | 99.1 |
| | 1600° C., 10 h | 80 | 180 | 0.150 | 96.1 |
| $3Al_2O_3, 2SiO_2$ | 1500° C., 10 h | 100 | 100 | 0.222 | 93.0 |
| $t-ZrO_2$ | 1500° C., 10 h | 100 | 110 | 0.541 | 90.8 |

TABLE 9-continued

| | Characteristics of other Ceramic Foams having Superfine Open Cell Structure | | | | |
|---|---|---|---|---|---|
| Composition | Heat treatment | Pore size (ppi)* | Average pore dia. ($\mu$m) | Unit bulk density (g/cc) | Unit porosity (%) |
| | 1500° C., 10 h | 80 | 160 | 0.370 | 93.7 |
| TiO$_2$ | 1200° C., 24 h | 60 | 245 | 0.202 | 95.3 |

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A composite material comprised of a ceramic substrate coated by a film of $(Ca_{1-x},Mg_x)Zr_4(PO_4)_6$ where x ranges between 0.1 and 0.9, said film of $(Ca_{1-x}, Mg_x)Zr_4(PO_4)_6$ being formed by the process of:

coating said ceramic substrate with a sol-gel having a plurality of precursor compounds in an aqueous or organic solvent, said precursor compounds comprising stoichiometric quantities of calcium, magnesium, zirconium, and phosphate, one or more of said precursor compounds having the general formula R-O-M, where R is an organic group having the formula $C_yH_{2y-1}$ where y ranges between 1 and 4, O is oxygen ion, and M is either a phosphorous or a metal ion selected from the group consisting of calcium, magnesium and zirconium, and heating said sol-gel at a temperature and for a time sufficient to remove said aqueous or organic solvent and organic components of said one or more organic precursor compounds to yield a single-phase $Ca_{1-x}, Mg_x)Zr_4(PO_4)_6$ coating.

2. The composite material recited in claim 1 wherein said ceramic substrate is selected from the group consisting of alumina, silicon carbide, and silicon nitride.

3. The composite material recited in claim 1 wherein said ceramic substrate is porous and said film of $Ca_{1-x}, Mg_x)Zr_4(PO_4)_6$ is present on an exterior surface of said ceramic substrate and on interior surfaces of pores within said ceramic substrate.

4. The composite material recited in claim 1 wherein said precursor compounds in said sol-gel used to form said film of $Ca_{1-x}, Mg_x)Zr_4(PO_4)_6$ include $Ca(CH_3CO_2)\cdot H_2O$, $Mg(C_2H_5O)_2$, $Zr(C_2H_5O)_4$, and $(C_2H_5O)_3P(O)$.

5. The composite material recited in claim 1 wherein said precursor compounds in said sol-gel used to form said film of $Ca_{1-x}, Mg_x)Zr_4(PO_4)_6$ include $CaCl_2$, $Mg(ClO_4)_2$, $Zr(C_3H_7O)_4$ and $(C_2H_5O)_3P(O)$.

6. A method of coating a ceramic substrate, comprising the steps of:

coating said ceramic substrate with a sol-gel having a plurality of precursor compounds in an aqueous or organic solvent, said precursor compounds comprising stoichiometric quantities of calcium, magnesium, zirconium, and phosphate, one or more of said precursor compounds having the general formula R-O-M, where R is an organic group having the formula $C_yH_{2y-1}$ where y ranges between 1 and 4, O is oxygen ion, and M is either a phosphorous or a metal ion selected from the group consisting of calcium, magnesium and zirconium; and heating said sol-gel at a temperature and for a time sufficient to remove said aqueous or organic solvent and organic components of said one or more organic precursor compounds to yield a single-phase $Ca_{1-x}, Mg_x)Zr_4(PO_4)_6$ coating.

7. The method of claim 6 wherein said coating step includes the steps of forming a solution of said precursor compounds selected from the group consisting of $Ca(CH_3CO_2)\cdot H_2O$, $Mg(C_2H_5O)_2$, $Zr(C_2H_5O)_4$, and $(C_2H_5O)_3P(O)$, applying said solution to said ceramic substrate, and drying said solution to form said sol-gel.

8. The method of claim 7 further comprising the step of immersing said ceramic substrate in said solution of said precursor compounds while said solution is maintained at room temperature.

9. The method of claim 7 further comprising the steps of immersing said ceramic substrate in said solution of precursor compounds while said solution is boiling, and allowing said solution of said precursor compounds to cool to room temperature while said ceramic substrate is immersed therein.

10. The method of claim 6 wherein said coating step includes the steps of forming a solution of said precursor compounds selected from the group consisting of $CaCl_2$, $Mg(ClO_4)_2$, $Zr(C_3H_7O)_4$ and $(C_2H_5O)_3P(O)$, applying said solution to said ceramic substrate, and drying said solution to form said sol-gel.

11. The method of claim 10 further comprising the step of immersing said ceramic substrate in said solution of said precursor compounds while said solution is maintained at room temperature.

12. The method of claim 10 further comprising the steps of immersing said ceramic substrate in said solution of precursor compounds while said solution is boiling, and allowing said solution of said precursor compounds to cool to room temperature while said ceramic substrate is immersed therein.

13. The method of claim 6 further comprising the step of oxidizing a surface of said ceramic substrate prior to said coating step.

14. The method of claim 13 wherein said step of oxidizing is performed by calcining said surface of said ceramic substrate.

* * * * *